(12) United States Patent
Wang et al.

(10) Patent No.: US 11,125,667 B2
(45) Date of Patent: Sep. 21, 2021

(54) EMBEDDABLE SEEPAGE MODULE CAPABLE OF BEING EMBEDDED INTO INTERFACE RING SHEAR APPARATUS CONSIDERING SOIL EROSION

(71) Applicant: ZHEJIANG UNIVERSITY, Zhejiang (CN)

(72) Inventors: Lizhong Wang, Zhejiang (CN); Zhen Guo, Zhejiang (CN); Shengjie Rui, Zhejiang (CN); Lingling Li, Zhejiang (CN); Yi Hong, Zhejiang (CN); Yujie Li, Zhejiang (CN); Wenjie Zhou, Zhejiang (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 259 days.

(21) Appl. No.: 16/507,963

(22) Filed: Jul. 10, 2019

(65) Prior Publication Data

US 2019/0331572 A1 Oct. 31, 2019

(30) Foreign Application Priority Data

Oct. 25, 2018 (CN) .......................... 201811251943.6

(51) Int. Cl.
*G01N 3/00* (2006.01)
*G01N 3/24* (2006.01)
*B63B 21/27* (2006.01)

(52) U.S. Cl.
CPC .............. *G01N 3/24* (2013.01); *B63B 21/27* (2013.01); *G01N 2203/0025* (2013.01); *G01N 2203/0236* (2013.01); *G01N 2203/0244* (2013.01)

(58) Field of Classification Search
CPC ............ G01N 3/24; G01N 2203/0025; G01N 2203/0236; G01N 2203/0244; B63B 21/27

See application file for complete search history.

(56) References Cited

U.S. PATENT DOCUMENTS

| 10,684,203 | B2* | 6/2020 | Zhou ........................ G01N 3/24 |
| 2012/0207545 | A1* | 8/2012 | Bouchard ............ H04M 11/066 |
| | | | 405/114 |
| 2017/0328824 | A1* | 11/2017 | Su ............................ G01L 1/00 |
| 2019/0195720 | A1* | 6/2019 | Su .......................... G01M 3/047 |
| 2019/0326473 | A1* | 10/2019 | Choi ....................... H01L 33/22 |
| 2021/0123841 | A1* | 4/2021 | Hu ........................... G01N 3/24 |

* cited by examiner

*Primary Examiner* — Max H Noori
*Assistant Examiner* — Masoud H Noori (57) ABSTRACT

An embeddable seepage module capable of being embedded into an interface ring shear apparatus is disclosed, wherein: the seepage module includes an annular cylinder, a seepage pressure regulation system, a top plate and a bottom plate; the interface ring shear apparatus includes an upper shear box and a lower shear box; the annular cylinder, the top plate, the bottom plate, the upper shear box and the lower shear box form an internal pressure cavity and an external pressure cavity; the internal pressure cavity is able to realize the precise double control of the soil seepage pressure and water flow through the seepage pressure regulation system; the external pressure cavity is able to collect fine soil particles under pressure seepage. In the case of soil seepage-shear coupling, the seepage module is assembled firstly for seepage, and after completing the seepage, the external pressure cavity is removed for ring shear tests.

10 Claims, 7 Drawing Sheets

EMBEDDABLE SEEPAGE MODULE CAPABLE OF BEING EMBEDDED INTO INTERFACE RING SHEAR APPARATUS CONSIDERING SOIL EROSION

CROSS REFERENCE OF RELATED APPLICATION

The present invention claims priority under 35 U.S.C. 119(a-d) to CN 201811251943.6, filed Oct. 25, 2018.

BACKGROUND OF THE PRESENT INVENTION

Field of Invention

The present invention relates to a seepage module, and more particularly a to seepage module capable of considering the soil erosion-shear coupling effect. The seepage module is able to be embedded into the interface ring shear apparatus to explore shear characteristics between the interface and the soil after seepage.

Description of Related Arts

The suction anchor is a large-scale cylindrical thin-walled steel structure. Due to precise positioning, economical efficiency, convenient construction and reusability, it is widely used to fix the upper platforms in deep sea. The water is pumped out of the suction anchor to form a negative pressure during installation. At this time, a seepage field is formed near the wall of the bucket accompanied by that fine particles inside the soil near the wall of the bucket being taken away, so that the interface strength between the soil and the wall of the bucket is reduced, which may decrease the uplift capacity of the suction anchor during service. However, there are currently no relevant experimental equipment and techniques to detect and evaluate the effect of seepage on the interface strength.

The ring shear apparatus is a good kind of interface strength testing apparatus. Compared with the direct shear apparatus and simple shear apparatus, the ring shear apparatus has many advantages, e.g. the ability to achieve infinite shear displacement, no stress nonuniform, and the ability to maintain a constant shear area during the test. At present, it is widely used to measure the interface shear strength between the soil and the structural interfaces (such as steel, concrete and geosynthetics).

In order to better study the influence of soil seepage-shear coupling on the interface strength, a seepage module combined with an existing ring shear apparatus is developed. This invention will help to understand the effect of seepage on interface strength and provide design guidance for the installation of the suction bucket foundation.

SUMMARY OF THE PRESENT INVENTION

Aiming at deficiencies of the prior art, an object of the present invention is to provide an embeddable seepage module, which is able to be combined with an existing ring shear apparatus, for investigating the influence of seepage on the interface strength. Combined with the conventional ring shear apparatus, the seepage module is able to simulate the shear behavior between the interface and the soil along the side of the suction anchor after seepage.

The present invention provides a technical solution as follows.

A seepage module capable of being embedded into an interface ring shear apparatus considering soil erosion, wherein: the interface ring shear apparatus comprises an upper shear box and a lower shear box both of which are annular, an inner wall and an outer wall of the upper shear box are made from a porous material; the seepage module comprises an annular cylinder, a seepage pressure regulation system, a top plate and a bottom plate, a water intake pipeline, a water discharge pipeline, a first valve, a second valve, a sedimentation tank, a filter screen, a water pressure sensor, an electromagnetic flowmeter and a pore pressure sensor; when the seepage module is embedded into the interface ring shear apparatus, the annular cylinder is arranged tightly outside the upper and lower shear boxes, the top plate is tightly disposed at a top of an inner wall of the upper shear box, the bottom plate is tightly disposed at a bottom of an inner wall of the lower shear box, in such a manner that the top plate, the bottom late, the inner wall of the upper shear box and the inner wall of the lower shear box form a sealed internal pressure cavity; the annular cylinder, the outer wall of the upper shear box and an outer wall of the lower shear box form a sealed external pressure cavity; the internal pressure cavity is connected with the seepage pressure regulation system through the water intake pipeline; the water pressure sensor, the electromagnetic flow meter and the first valve are located to on the water intake pipeline to realize a precise double control of a soil seepage pressure and water flow through the seepage pressure regulation system; the external pressure cavity is connected with the seepage pressure regulation system through the water discharge pipeline; the second valve, the sedimentation tank and the filter screen are located on the water discharge pipeline to collect fine soil particles under pressure seepage; the pore pressure sensor is located at the outer wall of the upper shear box to monitor the pore pressure of soil.

Preferably, the inner wall and the outer wall of the lower shear box, the top plate and the bottom plate are made from stainless steel.

Preferably, the annular cylinder comprises two semicircular cylinders which are conjoined together through bolts; for sealing, water-stops are located at joints of the two semicircular cylinders, of the annular cylinder and the upper shear box, and of the annular cylinder and the lower shear box to prevent water away.

Preferably, the water stops are made from rubber, multiple ribs each of which has a square cross section are located on a surface of each of the water stops and evenly spaced from each other. A shape of the water stops at the joints of the two semicircular cylinders is grooved. A shape of the water stops at the joints of the annular cylinder and the upper shear box, and of the annular cylinder and the lower shear box is circular.

Preferably, the top plate is sealed with the inner wall of the upper shear box through welding, and the bottom plate is sealed with the inner wall of lower shear box through welding.

Preferably, the water intake pipeline is connected to the internal pressure cavity at a center of the top plate.

Preferably, a probe of the pore pressure sensor is located in the upper shear box, the pore pressure sensor passes through the annular cylinder for reading outside the external pressure cavity to monitor the pore pressure of the soil.

Preferably, the bottom plate has a drainage hole which is closed when seeping and is opened after seepage for discharging water.

Preferably, a set of standard sieves are placed in the sedimentation tank to quantify a soil erosion amount. Sieve diameters of the standard sieves are 10 mm, 5 mm, 2 mm, 1 mm, 0.5 mm, 0.25 mm, 0.1 mm and 0.075 mm from top to bottom in order, respectively.

Preferably, four pairs of bending elements are uniformly arranged along a circumferential direction of the inner wall of a middle part of the upper shear box to test a shear modulus of sand before and after a seepage-shear coupling action; twelve soil pressure sensors are respectively uniformly arranged along the circumferential direction of the inner wall of an upper, the middle and a bottom part of the upper shear box to test a soil pressure and its distribution along a depth before and after the seepage-shear coupling action, the four soil pressure sensors arranged along the circumferential direction of the inner wall of the middle part of the upper shear box and the four pairs of bending elements are uniformly alternately distributed along the circumferential direction of the inner wall of the upper shear box.

In the present invention, the water pressure sensor is a high-precision water pressure sensor, the soil pressure sensors are high-precision soil pressure sensors.

The embedded seepage module is able to be installed in the ring shear apparatus when seepage is needed. When the soil seepage-shear coupling test is carried out to study the soil at the wall of the suction bucket, the two semicircular cylinders are conjoined with each other through bolts to form the annular cylinder, and then assembled with the outer wall of the upper shear box and the lower shear box to form the external pressure cavity; and then the sealing inspection is carried out to ensure good water tightness. The flow and seepage pressure are respectively adjusted to a constant value with the first valve and the second valve open. After completing the seepage, the external pressure cavity is able to be removed for interface shear, and the change of the interface strength is to able to be studied.

The present invention has advantages as follows. The seepage module of the present invention is able to be embedded in the ring shear apparatus to consider the seepage effect of the soil, so as to realize the real-time state quantity monitoring of the soil seepage-shear coupling action. In addition, the seepage module is able to be disassembled to make it convenient to use the ring shear apparatus.

In the drawings, 1: internal pressure cavity; 2: external pressure cavity; 3: water intake pipeline; 4: water discharge pipeline; 5: first valve; 6: second valve; 7: sedimentation tank; 8: filter screen; 9: seepage pressure regulation system; 10: water pressure sensor; 11: electromagnetic flowmeter; 12: pore pressure sensor; 12-1: probe; 13: upper shear box; 14: lower shear box; 15: top plate; 16: bottom plate; 17: annular cylinder; 18: bolt; 19: water-stop; 20: drainage hole; 21: standard sieve; 22: soil pressure sensor; 23: bending element.

DETAILED DESCRIPTION OF THE PREFERRED EMBODIMENT

A seepage module considering soil erosion is able to be embedded into an interface ring shear apparatus, and the interface ring shear apparatus comprises an upper shear box 13 and a lower shear box 14 both of which are annular.

Figure 1:
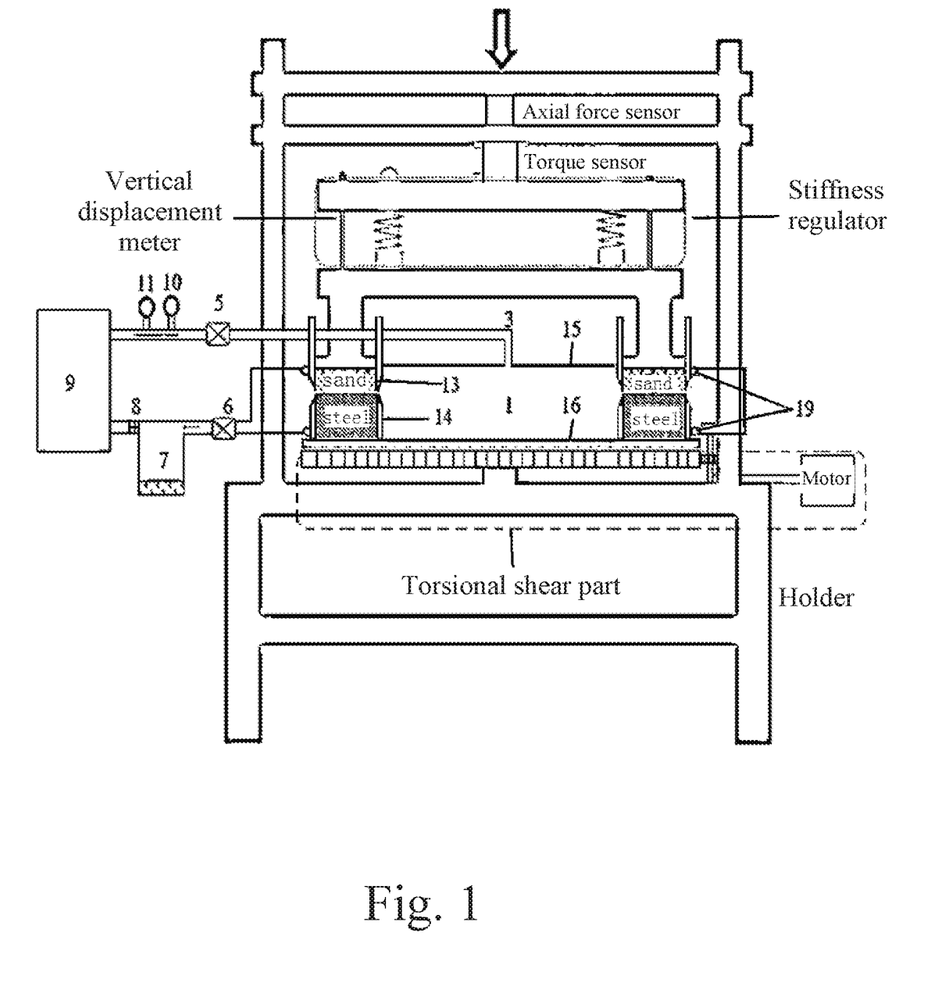
FIG. 1 is a structurally schematic view of an embeddable seepage module capable of being embedded into an interface ring shear apparatus according to a preferred embodiment of the present invention.
Figure 2:
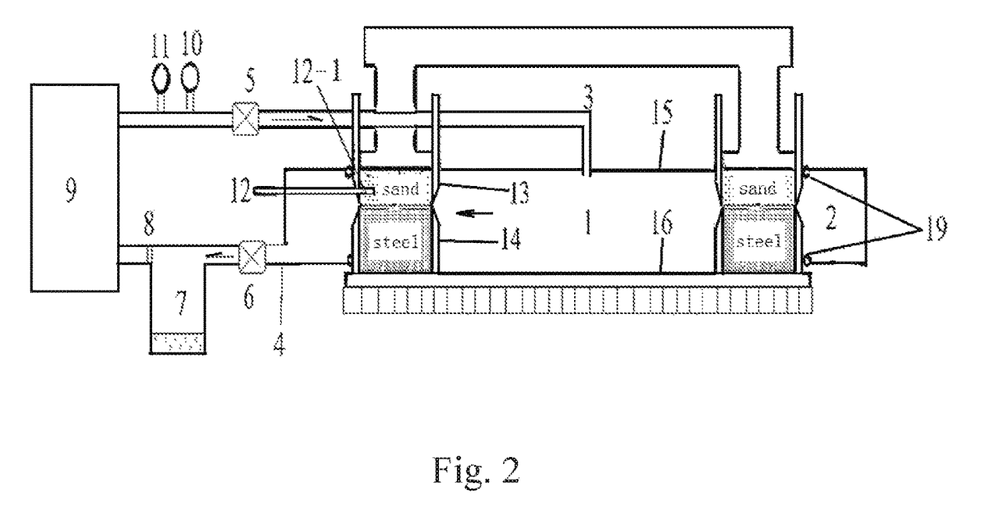
FIG. 2 is a front view of the embeddable seepage module according to the preferred embodiment of the present invention.
Figure 3:
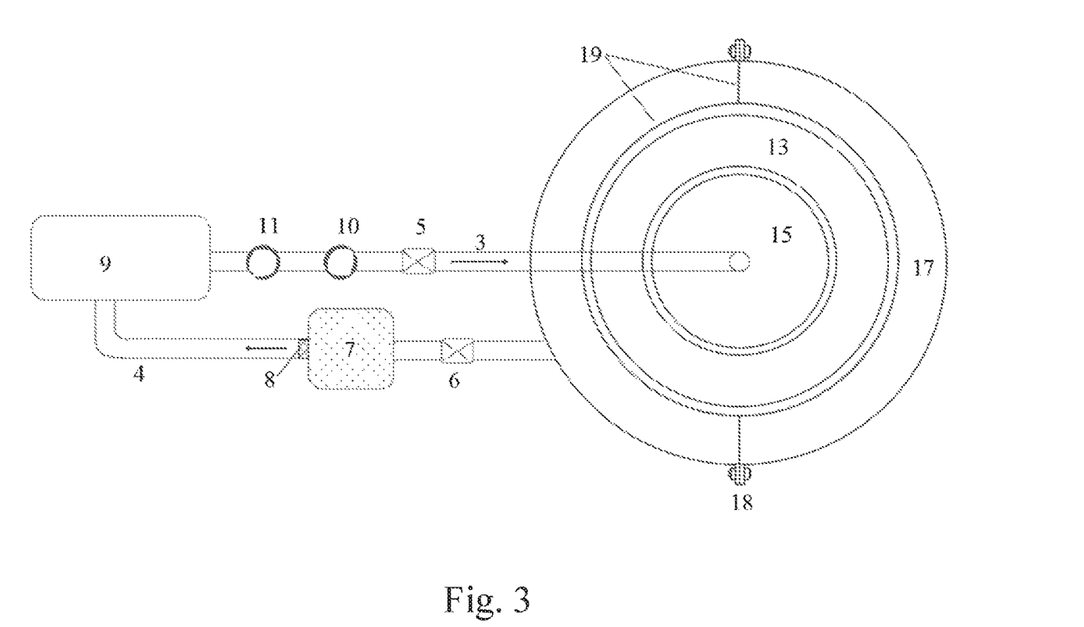
FIG. 3 is a top view of the embeddable seepage module according to the preferred embodiment of the present invention.

Referring to FIGS. 1-3 of the drawings, the seepage module comprises an annular cylinder 17, a seepage pressure regulation system 9, a top plate 15 and a bottom plate 16, a water intake pipeline 3, a water discharge pipeline 4, a first valve 5, a second valve 6, a sedimentation tank 7, a filter screen 8, a water pressure sensor 10, an electromagnetic flowmeter 11 and a pore pressure sensor 12. When the seepage module is embedded into the interface ring shear apparatus, the annular cylinder 17 is arranged tightly outside the upper and lower shear boxes, the top plate 15 is tightly provided at a top of an inner wall of the upper shear box 13, the bottom plate 16 is tightly provided at a bottom of an inner wall of the lower shear box 14, in such a manner that the top plate 15, the bottom late 16, the inner wall of the upper shear box 13 and the inner wall of the lower shear box 14 form a sealed internal pressure cavity 1; the annular cylinder 17, an outer wall of the upper shear box 13 and an outer wall of the lower shear box 14 form a sealed external pressure cavity 2; the internal pressure cavity 1 is connected with the seepage pressure regulation system 9 through the water intake pipeline 3; the water pressure sensor 10, the electromagnetic flow meter 11 and the first valve 5 are located on the water intake pipeline 3 in sequence; the external pressure cavity 2 is connected with the seepage pressure regulation system 9 through the water discharge pipeline 4; the second valve 6, the sedimentation tank 7 and the filter screen 8 are located on the water discharge pipeline 4 in sequence; the pore pressure sensor 12 is located at an outer wall of the upper shear box 13 to monitor a pore pressure of soil. According to a preferred embodiment of the present invention, inner and outer ring diameters of the upper shear box and the lower shear box are 200 mm and 300 mm, respectively; a width of the external pressure cavity is 100 mm. The seepage module is able to apply a seepage pressure in a range of 0 to 300 kPa on the soil by the seepage pressure regulation system 9.

Preferably, the inner wall and the outer wall of the upper shear box 13 are made from a porous material which is only permeable to water and fine soil particles and prevents large particles from flowing out, and a porosity of the particles depends on a particle size distribution of the sand in the test; the inner wall and the outer wall of the lower shear box 14, the top plate 15 and the bottom plate 16 are made from stainless steel. Moreover, the pore pressure sensor 12 is located at the outer wall of the upper shear box 13 and passes through the annular cylinder 17 for reading outside the external pressure cavity to monitor the pore pressure of the soil, and a probe of the pore pressure sensor is located at the inner wall of the upper shear box.

Figure 4:
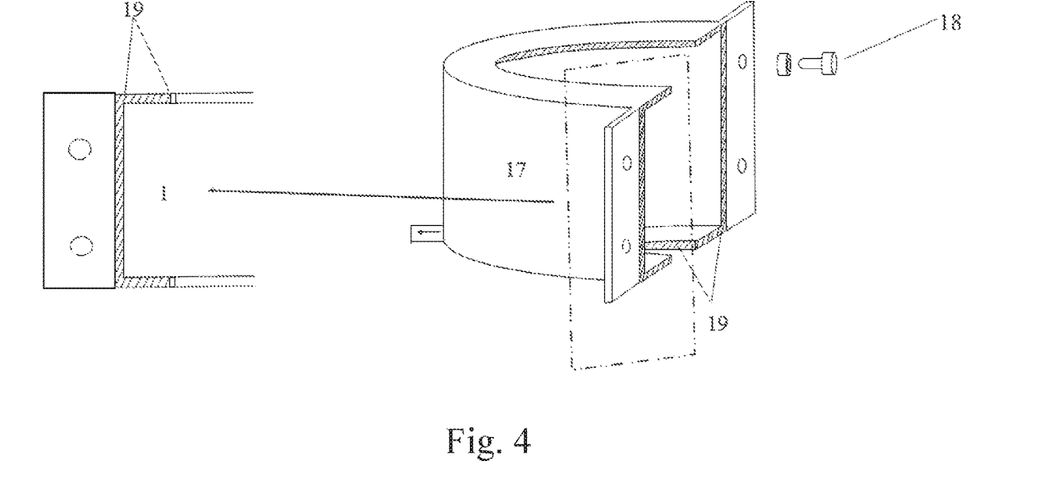
FIG. 4 is an assembled diagram of an external pressure cavity according to the preferred embodiment of the present invention.

The annular cylinder 17 comprises two semicircular cylinders which are conjoined with each other through bolts 18. For sealing, water-stops 19 are located at joints of the two semicircular cylinders, of the annular cylinder 17 and the upper shear box 13, and of the annular cylinder 17 and the lower shear box 14. The water-stops 19 are made from rubber, and multiple ribs each of which has a square cross section are located on a surface of each of the water-stops 19 and evenly spaced from each other. The water-stops at the joints of the two semicircular cylinders are in a shape of groove. The water-stops at the joints of the annular cylinder and the upper shear box, and of the annular cylinder and the lower shear box are in a shape of circular, referring to FIG. 4 of the drawings.

Figure 5:
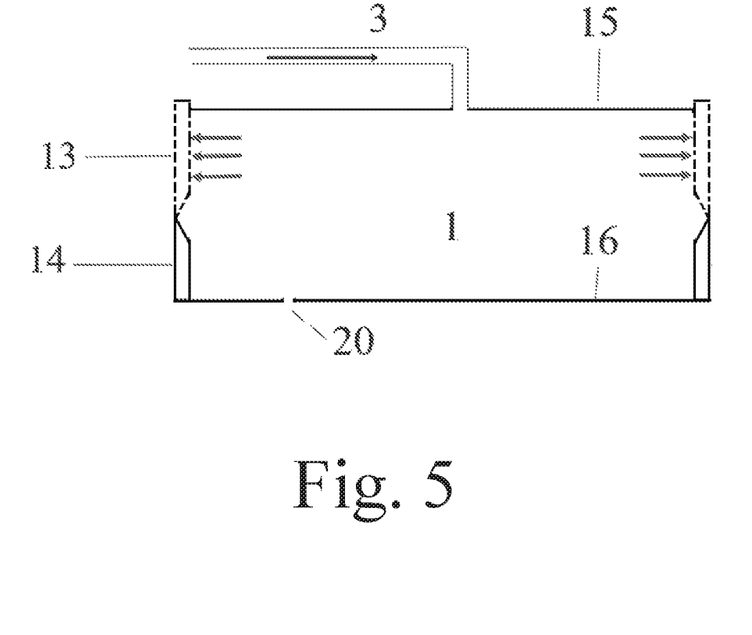
FIG. 5 is a sectional view of an internal pressure cavity according to the preferred embodiment of the present invention.
Figure 6:
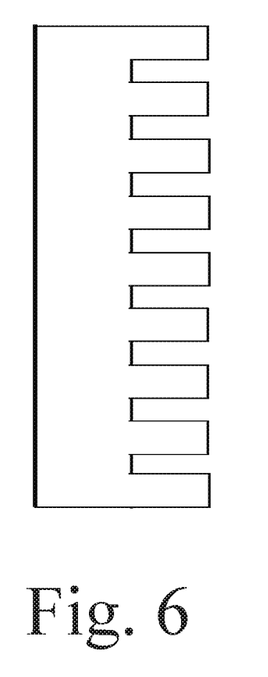
FIG. 6 is a sectional view of a water-stop according to the preferred embodiment of the present invention.

The top plate 15 is sealed with the inner wall of the upper shear box 13 through welding, and the bottom plate 16 is sealed with the inner wall of lower shear box 14 through welding.

The water intake pipeline 3 is connected with the internal pressure cavity 1 at a center of the top plate 15. The bottom plate 16 has a drainage hole 20 which is closed when seeping and opened after seepage for discharging water.

Figure 7:
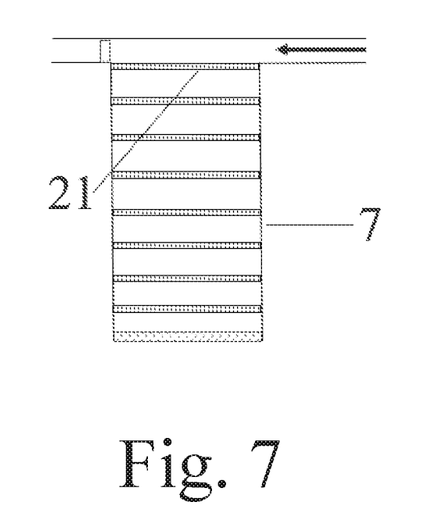
FIG. 7 is a side view of a set of standard sieves according to the preferred embodiment of the present invention.

A set of standard sieves 21 are placed in the sedimentation tank 7 to quantify a soil erosion amount, and sieve diameters of the standard sieves 21 are respectively 10 mm, 5 mm, 2 mm, 1 mm, 0.5 mm, 0.25 mm, 0.1 mm and 0.075 mm from top to bottom in order to quantify the soil erosion amount, referring to FIG. 7 of the drawings.

Figure 8:
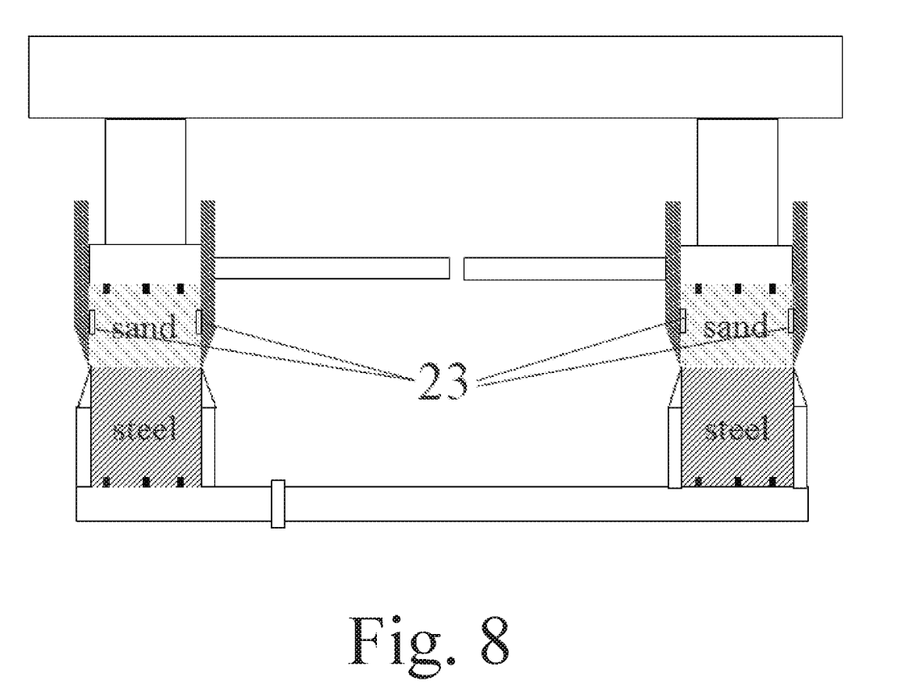
FIG. 8 is a side view of bending elements according to the preferred embodiment of the present invention.
Figure 9:
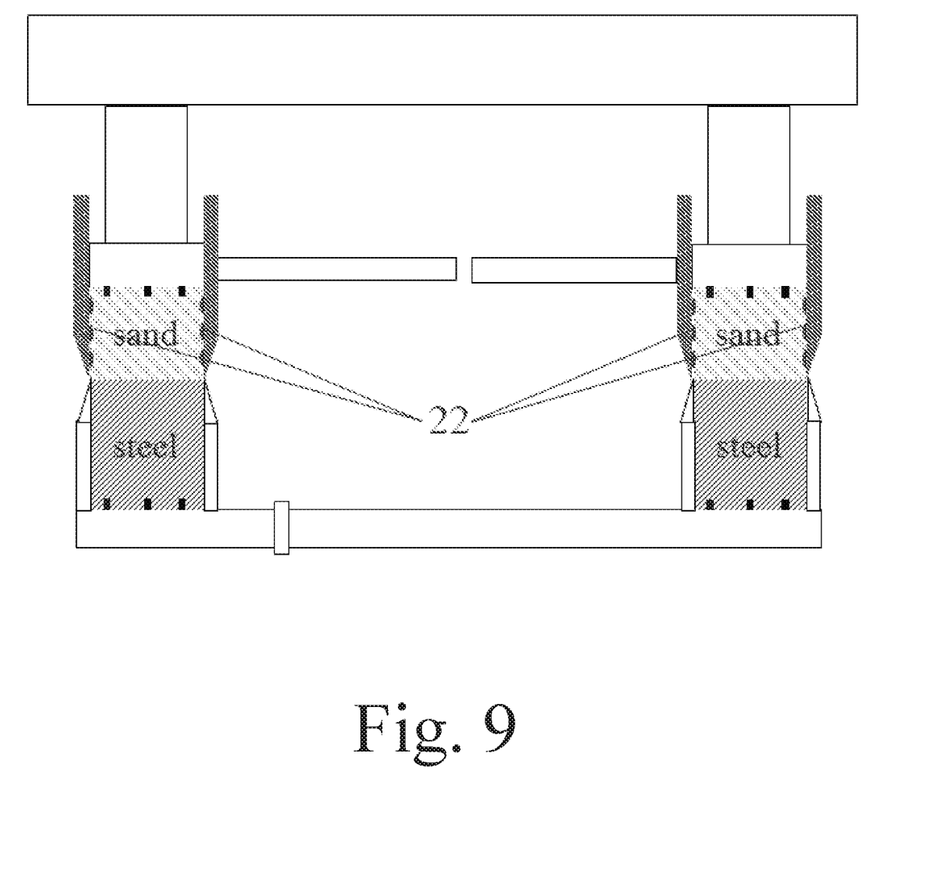
FIG. 9 is a side view of soil pressure sensors according to the preferred embodiment of the present invention.

Four pairs of bending elements 23 are uniformly arranged along a circumferential direction of the inner wall of a middle part of the upper shear box 13 to test a shear modulus of the sand before and after seepage-shear coupling action; twelve soil pressure sensors 22 are respectively uniformly arranged along the circumferential direction of the inner wall of an upper, the middle and a bottom part of the upper shear box to test the soil pressure and its distribution along a depth before and after the seepage-shear coupling action. The four soil pressure sensors 22 arranged long the circumferential direction of the inner wall of the middle part of the upper shear box 13 and the four pairs of bending elements 23 are uniformly alternately distributed along the circumferential direction of the inner wall of the upper shear box 13, referring to FIGS. 8-9 of the drawings.

When performing the soil seepage-shear coupling test simulation, the soil seepage should be carried out firstly, and the ring shear should be carried out after completing the seepage.

The working principle of the present invention is described as follows.

For process of seepage, the two semicircular cylinders are conjoined with each other through the bolts 18 to form the annular cylinder 17, and then assembled with the outer wall of the upper shear box 13 and the lower shear box 14 to form the sealed external pressure cavity 2, and then the top plate 15 and the bottom plate 16 are installed to form the sealed internal pressure cavity 1; the external pressure cavity 2 is connected with the sedimentation tank 7 and the seepage pressure regulation system 9 through the water discharge pipeline 4, and a seal inspection is performed; the internal pressure cavity 1 is connected with the seepage pressure regulation system 9 through the water intake pipeline 3, the flow and the seepage pressure are adjusted to a constant value through the seepage pressure regulation system 9, the first valve 5 on the water intake pipeline 3 is opened; after a pressure of the internal pressure cavity 1 is a constant value, the second valve 6 on the water discharge pipeline 4 is opened for soil seepage, and the pore pressure of soil is monitored in real time through the pore pressure sensor 12. After completing the seepage, the first valve 5 on the water intake pipeline 3 is closed, and then the second valve 6 on the water discharge pipeline 4 is closed, and simultaneously drainage hole 20 is opened to discharge water in the internal pressure cavity 1.

In the process of seepage and shear, the shear wave velocity of the soil and soil pressure are monitored in real time, and the shear modulus and the evolution law of soil pressure with time are obtained. Fine particles in the sedimentation tank 7 are collected for analyzing the amount of seepage erosion.

The external pressure cavity 2 is removed for interface shear.

What is claimed is:
1. An embeddable seepage module capable of being embedded into an interface ring shear apparatus considering soil erosion, wherein: the interface ring shear apparatus comprises an upper shear box (13) and a lower shear box (14);
an inner wall and an outer wall of the upper shear box (13) are made from a porous material;
the seepage module comprises an annular cylinder (17), a seepage pressure regulation system (9), a top plate (15), a bottom plate (16), a water intake pipeline (3), a water discharge pipeline (4), a first valve (5), a second valve (6), a sedimentation tank (7), a filter screen (8), a water pressure sensor (10), an electromagnetic flowmeter (11) and a pore pressure sensor (12);
when the seepage module is embedded into the interface ring shear apparatus, the annular cylinder (17) is arranged outside the upper and lower shear boxes, the top plate (15) is provided at a top of an inner wall of the upper shear box (13), the bottom its plate (16) is provided at a bottom of an inner wall of the lower shear box (14), in such a manner that the top plate (15), the bottom plate (16), the inner wall of the upper shear box (13) and the inner wall of the lower shear box (14) form a sealed internal pressure cavity (1); the annular cylinder (17), an outer wall of the upper shear box (13) and an outer wall of the lower shear box (14) form a sealed external pressure cavity (2); the internal pressure cavity (1) is connected with the seepage pressure regulation system (9) through the water intake pipeline (3); the water pressure sensor (10), the electromagnetic flowmeter (11) and the first valve (5) are located on the water intake pipeline (3); the external pressure cavity (2) is connected with the seepage pressure regulation system (9) through the water discharge pipeline (4); the second valve (6), the sedimentation tank (7) and the filter screen (8) are located on the water discharge pipeline (4); the pore pressure sensor (12) is located at the outer wall of the upper shear box (13) to monitor a pore pressure of soil.

2. The embeddable seepage module, as recited in claim 1, wherein: the inner wall and the outer wall of the lower shear box (14), the top plate (15) and the bottom plate (16) are made from stainless steel.

3. The embeddable seepage module, as recited in claim 1, wherein: the annular cylinder (17) comprises two semicircular cylinders conjoined with each other; for sealing, water-stops (19) are located at joints of the two semicircular cylinders, of the annular cylinder (17) and the upper shear box (13), and of the annular cylinder (17) and the lower shear box (14).

4. The embeddable seepage module, as recited in claim 3, wherein: the water-stops (19) are made from rubber, multiple ribs each of which has a square cross section are located on a surface of each of the water-stops (19) and evenly spaced from each other; the water-stops (19) at the joints of the two semicircular cylinders are in a shape of groove and the water-stops (19) at the joints of the annular cylinder and the annular upper shear box (13), and of the annular cylinder (17) and the lower shear box (14) are in a shape of circular.

5. The embeddable seepage module, as recited in claim 1, wherein: the top plate (15) is sealed with the inner wall of the upper shear box (13) through welding, and the bottom plate (16) is sealed with the inner wall of lower shear box (14) through welding.

6. The embeddable seepage module, as recited in claim 1, wherein: the water intake pipeline (3) is communicated with the internal pressure cavity (1) at a center of the top plate (15).

7. The embeddable seepage module, as recited in claim 1, wherein: a probe of the pore pressure sensor (12) is located in the upper shear box (13), and the pore pressure sensor (12) passes through the annular cylinder (17) for reading to monitor the pore pressure of the soil.

8. The embeddable seepage module, as recited in claim 1, wherein: the bottom plate (16) has a drainage hole (20) which is closed when seeping and is opened after seepage for discharging water.

9. The embeddable seepage module, as recited in claim 1, wherein: a set of standard sieves are placed in the sedimentation tank (7) to quantify a soil erosion amount, whose sieve diameters are respectively 10 mm, 5 mm, 2 mm, 1 mm, 0.5 mm, 0.25 mm, 0.1 mm and 0.075 mm from top to bottom in order to quantify the soil erosion amount.

10. The embeddable seepage module, as recited in claim 1, wherein: four pairs of bending elements (23) are uniformly arranged along a circumferential direction of the inner wall of a middle part of the upper shear box (13) to test a shear modulus of sand before and after a seepage-shear coupling action; twelve soil pressure sensors (22) are respectively uniformly arranged along the circumferential direction of the inner wall of an upper, the middle and a bottom part of the upper shear box (13) to test a soil pressure and a distribution along a depth before and after the seepage-shear coupling action; the four soil pressure sensors arranged along the circumferential direction of the inner wall of the middle part of the upper shear box (13) and the four pairs of bending elements are uniformly alternately distributed along the circumferential direction of the inner wall of the upper shear box (13).

* * * * *